(12) United States Patent
Ueda et al.

(10) Patent No.: US 11,273,992 B2
(45) Date of Patent: Mar. 15, 2022

(54) SORTING FACILITY AND STATUS CHECKING METHOD FOR TRAVELING CARRIAGE

(71) Applicant: DAIFUKU CO., LTD., Osaka (JP)

(72) Inventors: Yuichi Ueda, Shiga (JP); Osamu Matsui, Shiga (JP); Hiroyuki Koide, Shiga (JP); Atsushi Ishikura, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 17/155,742

(22) Filed: Jan. 22, 2021

(65) Prior Publication Data

US 2021/0229927 A1 Jul. 29, 2021

(30) Foreign Application Priority Data

Jan. 24, 2020 (JP) .............................. JP2020-009565

(51) Int. Cl.
*B65G 43/08* (2006.01)
*B65G 23/22* (2006.01)
*B65G 47/50* (2006.01)

(52) U.S. Cl.
CPC ............. *B65G 43/08* (2013.01); *B65G 23/22* (2013.01); *B65G 47/50* (2013.01); *B65G 2203/0291* (2013.01); *B65G 2203/042* (2013.01)

(58) Field of Classification Search
CPC ...... B65G 2203/042; B65G 2203/0291; B65G 43/08; B65G 23/22; B65G 17/345; B65G 47/503; B65G 47/50
USPC ......................................... 198/370.06, 371.2
See application file for complete search history.

(56) References Cited

U.S. PATENT DOCUMENTS

| 5,558,520 | A | 9/1996 | Werzberger | |
| 7,562,760 | B2* | 7/2009 | Affaticati | B07C 5/36 |
| | | | | 198/357 |
| 8,260,574 | B1 | 9/2012 | Schuitema | |
| 10,226,794 | B2* | 3/2019 | Vegh | B07C 3/02 |
| 10,768,832 | B2* | 9/2020 | Farrell | G06F 12/1491 |

(Continued)

FOREIGN PATENT DOCUMENTS

| EP | 3460610 A1 | 3/2019 |
| JP | 2006-199505 A | 8/2006 |

OTHER PUBLICATIONS

European Search Report dated Jun. 9, 2021 in corresponding European Patent Appl. No. 21152340.2.

*Primary Examiner* — James R Bidwell
(74) *Attorney, Agent, or Firm* — Kusner & Jaffe

(57) ABSTRACT

A supervisory controller determines the control status of a conveyor belt by a control unit. When it is determined that the control status of the conveyor belt is abnormal, the supervisory controller prohibits loading an article onto a traveling carriage and instructs the control unit to reset the control unit. When it is determined again that the control status of the conveyor belt by the control unit subjected to the reset instruction is abnormal, the supervisory controller prohibits loading an article onto the traveling carriage and acquires an abnormality record from the control unit. When it is determined that the control status of the conveyor belt by the control unit subjected to the reset instruction is normal, the supervisory controller acquires the abnormality record from the control unit.

12 Claims, 5 Drawing Sheets

(56) References Cited

U.S. PATENT DOCUMENTS

2008/0135378 A1\* 6/2008 Mignano .............. B65G 17/345
  198/370.06
2013/0167754 A1 7/2013 Rosenwinkel
2016/0039611 A1\* 2/2016 Hoynash .............. B65G 17/345
  198/358

\* cited by examiner

SORTING FACILITY AND STATUS CHECKING METHOD FOR TRAVELING CARRIAGE

FIELD OF THE INVENTION

The present invention relates to a sorting facility in which an article is sorted by a sorter device provided in a traveling carriage traveling along a closed path, and a status checking method for a traveling carriage.

BACKGROUND OF THE INVENTION

Conventional sortation facilities in which articles are sorted by sorter devices provided in traveling carriages traveling along a closed path include a cross-belt sortation system. One such system is disclosed in Japanese Patent Laid-Open No. 2006-199505.

The cross-belt sortation system of Japanese Patent Laid-Open No. 2006-199505 includes a plurality of conveyance units moving on a conveyance path (conveyance route) between introduction stations and unloading stations. The conveyance units are each a traveling carriage that conveys a package (article) on the conveyance path. The traveling carriage includes a conveyance belt (sorter device) on which a package can be placed, in an upper part of the traveling carriage.

The conveyance belt can move in a direction perpendicular to the conveyance path so that a package is unloaded onto a reception port of a selected unloading station. The conveyance belt is driven by a motor that is controlled by a servo driving device (control unit of a driving device). That is, the operation of the conveyance belt is controlled by the servo driving device. Therefore, a malfunction of the conveyance belt occurs due to a failure (abnormality) of the conveyance belt itself and, in addition, a failure (abnormality) of the servo driving device including the motor. In a case where such a malfunction of the conveyance belt occurs, it is necessary to determine whether the malfunction has occurred due to a failure (abnormality) of the conveyance belt itself or a failure (abnormality) of the servo driving device including the motor.

However, in a case where a failure (abnormality) of a sorter device occurs in a conventional sorting facility as described in Japanese Patent Laid-Open No. 2006-199505, identification of a cause of the failure requires a traveling carriage including the sorter device with the abnormality to be stopped once. However, in order to stop the traveling of the traveling carriage, it is necessary to stop other traveling carriages that are lined up with the traveling carriage. That is, the identification of the cause requires stopping conveyance operation of traveling carriages that are able to convey articles. The identification of the cause can be started only after the traveling carriages are stopped. Therefore, a long time is taken to start maintenance from stopping the traveling carriages.

Moreover, in a conventional sorting facility, a control unit of a driving device that controls a sorter device stops controlling the sorter device when any abnormality occurs in the device. Therefore, the controlling of the sorter device is stopped even when a minor abnormality such as a temporary overcurrent occurs. The operation of the sorter device is thus stopped whenever any abnormality occurs in the control unit of the driving device.

For that reason, unfortunately, the operation of loading articles onto sorter devices cannot be performed efficiently.

SUMMARY OF THE INVENTION

The present invention has an objective to provide a sorting facility that can identify a cause of an abnormality of a sorter device while a traveling carriage is traveling and can control a sorter device with an abnormal status of a control unit of a driving device taken into account, and to provide a status checking method for a traveling carriage.

The problem to be solved by the present invention has been described thus far. Next, solutions for solving this problem will be described.

A sorting facility according to the present invention is a sorting facility in which an article is sorted by a sorter device provided in a traveling carriage traveling along a closed path, the sorting facility including: a driving device provided in the traveling carriage, the driving device driving the sorter device; and a control device controlling the driving device wirelessly, wherein the driving device includes a control unit controlling the sorter device based on an instruction from the control device, the control unit sends information about the control status of the sorter device to the control device as a response, according to a response instruction provided from the control device, and retains, in a case where an abnormality occurs in controlling of the sorter device, the abnormality as an abnormality record, and the control device determines, based on whether information about the control status has been sent from the control unit as a response and based on content of the information about the control status, the control status of the sorter device by the control unit, performs, when it is determined that the control status of the sorter device by the control unit is abnormal, control for prohibiting loading an article onto a traveling carriage including the control unit determined to have the abnormality and provides an instruction to reset the control unit, performs, when it is determined again that the control status of the sorter device by the control unit is abnormal after the traveling carriage including the control unit subjected to the reset instruction makes a round of the path, control for prohibiting loading an article onto the traveling carriage including the control unit and acquires the abnormality record retained in the control unit, and acquires, when it is determined that the control status of the sorter device by the control unit is normal after the traveling carriage including the control unit subjected to the reset instruction makes a round of the path, the abnormality record retained in the control unit.

Here, the information about the control status of the sorter device refers to information as to whether the control unit is controlling the sorter device normally. The resetting of the control unit refers to recovering the operation of the entire control unit that has been stopped by a self-maintenance function of the control unit.

In this configuration, in a case where the control device once provides an instruction for reset to the control unit that is determined to have an abnormality in the control status of the sorter device while the traveling carriage is traveling and then determines the control unit to have an abnormality in the control status of the sorter device again, the control device prohibits loading an article onto the traveling carriage including the control unit and acquires the abnormality record from the control unit.

Furthermore, the driving device includes a driving motor driving the sorter device, the control unit includes a driving control inverter controlling the driving motor, the driving control inverter sends information about the control status of the driving motor to the control device as a response, according to a response instruction provided from the control device, and retains, in a case where an abnormality occurs in controlling of the driving motor, the abnormality as an abnormality record, and the control device determines, based on whether information about the control status has been sent from the driving control inverter as a response and based on content of the information about the control status, the control status of the driving motor by the driving control inverter, performs, when it is determined that the control status of the driving motor by the driving control inverter is abnormal, control for prohibiting loading an article onto a traveling carriage including the driving control inverter determined to have the abnormality and provides an instruction to reset the driving control inverter, performs, when it is determined again that the control status of the driving motor by the driving control inverter is abnormal after the traveling carriage including the driving control inverter subjected to the reset instruction makes a round of the path, control for prohibiting loading an article onto the traveling carriage including the driving control inverter and acquires the abnormality record retained in the driving control inverter, and acquires, when it is determined that the control status of the driving motor by the driving control inverter is normal after the traveling carriage including the driving control inverter subjected to the reset instruction makes a round of the path, the abnormality record retained in the driving control inverter.

Here, the information about the control status of the driving motor refers to information as to whether the driving control inverter is controlling the driving motor normally. The resetting of the driving control inverter refers to recovering the operation of the entire driving control inverter that has been stopped by a self-maintenance function of the driving control inverter.

In this configuration, in a case where the control device once provides an instruction for reset to the driving control inverter that is determined to have an abnormality in the control status of the driving motor while the traveling carriage is traveling and then determines the driving control inverter to have an abnormality in the control status of the driving motor again, the control device prohibits loading an article onto the traveling carriage including the driving control inverter and acquires the abnormality record from the driving control inverter.

Furthermore, the driving device includes a power generating motor generating electric power for driving the sorter device, the control unit includes a power generation control inverter controlling the power generating motor, the power generation control inverter sends information about the control status of the power generating motor to the control device as a response, according to a response instruction provided from the control device, and retains, in a case where an abnormality occurs in controlling of the power generating motor, the abnormality as an abnormality record, and the control device determines, based on whether information about the control status has been sent from the power generation control inverter as a response and based on content of the information about the control status, the control status of the power generating motor by the power generation control inverter, performs, when it is determined that the control status of the power generating motor by the power generation control inverter is abnormal, control for prohibiting loading an article onto a traveling carriage including the power generation control inverter determined to have the abnormality and provides an instruction to reset the power generation control inverter, performs, when it is determined again that the control status of the power generating motor by the power generation control inverter is abnormal after the traveling carriage including the power generation control inverter subjected to the reset instruction makes a round of the path, control for prohibiting loading an article onto the traveling carriage including the power generation control inverter and acquires the abnormality record retained in the power generation control inverter, and acquires, when it is determined that the control status of the power generating motor by the power generation control inverter is normal after the traveling carriage including the power generation control inverter subjected to the reset instruction makes a round of the path, the abnormality record retained in the power generation control inverter.

Here, the information about the control status of the power generating motor refers to information as to whether the power generation control inverter is controlling the power generating motor normally. The resetting of the power generation control inverter refers to recovering the operation of the entire power generation control inverter that has been stopped by a self-maintenance function of the power generation control inverter.

In this configuration, in a case where the control device once provides an instruction for reset to the power generation control inverter that is determined to have an abnormality in the control status of the power generating motor while the traveling carriage is traveling and then determines the power generation control inverter to have an abnormality in the control status of the power generating motor again, the control device prohibits loading an article onto the traveling carriage including the power generation control inverter and acquires the abnormality record from the power generation control inverter.

Furthermore, the sorter device includes a conveyor belt, the sorter device includes a sensor detecting rotation of a belt of the conveyor belt, and the control device controls the driving control inverter as to whether to permit or prohibit loading an article onto the traveling carriage, based on whether there is a detection signal from the sensor.

In this configuration, whether to permit or prohibit the loading of an article onto the traveling carriage is controlled based on whether there is the detection signal from the sensor that detects the rotation of the belt of the conveyor belt.

A status checking method for a traveling carriage according to the present invention is a status checking method for a traveling carriage, the traveling carriage traveling along a closed path and sorting an article using a sorter device in a sorting facility for sorting articles, the traveling carriage including a driving device driving the sorter device, the sorting facility including a control device controlling the driving device wirelessly, the driving device including a control unit controlling the sorter device based on an instruction from the control device, the status checking method including: an information response instructing step of wirelessly instructing, by the control device, a control unit of a traveling carriage traveling on the path to send information about the control status of the sorter device as a response; an information responding step of wirelessly sending, by the control unit, information about the control status of the sorter device to the control device as a response, according to an instruction from the control device in the information response instructing step; a control status determining step of determining, by the control device, the control status of the sorter device by the control unit based on whether information about the control status has been sent from the control unit as a response in the information responding step and based on content of the information about the control status; an abnormality record retaining step of retaining, by the control unit, when the control device determines in the control status determining step that the control status of the sorter device by the control unit is abnormal, the abnormality as an abnormality record; a loading prohibition controlling step of performing, by the control device, when the control device determines in the control status determining step that the control status of the sorter device by the control unit is abnormal, control for prohibiting loading an article onto a traveling carriage including the control unit determined to have the abnormality; a reset instructing step of providing, by the control device, an instruction to reset the control unit on which the control for prohibiting loading an article is performed in the loading prohibition controlling step; a record acquiring step of acquiring, when the control device determines that the control status of the sorter device by the control unit is normal after the traveling carriage including the control unit subjected to the reset instruction in the reset instructing step makes a round of the path, the abnormality record retained in the control unit; an abnormality record acquiring step of performing, when the control device determines again that the control status of the sorter device by the control unit is abnormal after the traveling carriage including the control unit reset in the reset instructing step makes a round of the path, control for prohibiting loading an article onto the traveling carriage including the control unit, and acquiring the abnormality record retained in the control unit; and an abnormality determining step of determining, by the control device, an abnormality of the sorter device based on the abnormality record acquired in the record acquiring step and the abnormality record acquiring step.

In this method, in a case where the control device once provides an instruction for reset to the control unit that is determined to have an abnormality in the control status of the sorter device while the traveling carriage is traveling and then determines the control unit to have an abnormality in the control status of the sorter device again, the control device prohibits loading an article onto the traveling carriage including the control unit, acquires the abnormality record from the control unit, and determines the abnormality of the sorter device based on the acquired abnormality record.

Furthermore, the driving device includes a driving motor driving the sorter device, the control unit includes a driving control inverter controlling the driving motor, and the status checking method includes: a first information response instructing step of wirelessly instructing, by the control device, a driving control inverter of a traveling carriage traveling on the path to send information about the control status of the driving motor as a response; a first information responding step of wirelessly sending, by the driving control inverter, information about the control status of the driving motor to the control device as a response, according to an instruction from the control device in the first information response instructing step; a first control status determining step of determining, by the control device, the control status of the driving motor by the driving control inverter, based on whether information about the control status has been sent from the driving control inverter as a response in the first information responding step and based on content of the information about the control status; a first abnormality record retaining step of retaining, by the driving control inverter, when the control device determines in the first control status determining step that the control status of the driving motor by the driving control inverter is abnormal, the abnormality as an abnormality record; a first loading prohibition controlling step of performing, by the control device, when the control device determines in the first control status determining step that the control status of the driving motor by the driving control inverter is abnormal, control for prohibiting loading an article onto a traveling carriage including the driving control inverter determined to have the abnormality; a first reset instructing step of providing, by the control device, an instruction to reset the driving control inverter on which the control for prohibiting loading an article is performed in the first loading prohibition controlling step; a first record acquiring step of acquiring, when the control device determines that the control status of the driving motor by the driving control inverter is normal after the traveling carriage including the driving control inverter subjected to the reset instruction in the first reset instructing step makes a round of the path, the abnormality record retained in the driving control inverter; a first abnormality record acquiring step of performing, when the control device determines again that the control status of the driving motor by the driving control inverter is abnormal after the traveling carriage including the driving control inverter reset in the first reset instructing step makes a round of the path, control for prohibiting loading an article onto the traveling carriage including the driving control inverter, and acquiring the abnormality record retained in the driving control inverter; and a first abnormality determining step of determining, by the control device, an abnormality of the sorter device based on the abnormality record acquired in the first record acquiring step and the first abnormality record acquiring step.

In this method, in a case where the control device once provides an instruction for reset to the driving control inverter that is determined to have an abnormality in the control status of the driving motor while the traveling carriage is traveling and then determines the driving control inverter to have an abnormality in the control status of the driving motor again, the control device prohibits loading an article onto the traveling carriage including the driving control inverter, acquires the abnormality record from the driving control inverter, and determines the abnormality of the sorter device based on the acquired abnormality record.

Furthermore, the driving device includes a power generating motor generating electric power for driving the sorter device, the control unit includes a power generation control inverter controlling the power generating motor, and the status checking method includes: a second information response instructing step of wirelessly instructing, by the control device, a power generation control inverter of a traveling carriage traveling on the path to send information about the control status of the power generating motor as a response; a second information responding step of wirelessly sending, by the power generation control inverter, information about the control status of the power generating motor to the control device as a response, according to an instruction from the control device in the second information response instructing step; a second control status determining step of determining, by the control device, the control status of the power generating motor by the power generation control inverter, based on whether information about the control status has been sent from the power generation control inverter as a response in the second information responding step and based on content of the information about the control status; a second abnormality record retaining step of retaining, by the power generation control inverter, when the control device determines in the second control status determining step that the control status of the power generating motor by the power generation control inverter is abnormal, the abnormality as an abnormality record; a second loading prohibition controlling step of performing, by the control device, when the control device determines in the second control status determining step that the control status of the power generating motor by the power generation control inverter is abnormal, control for prohibiting loading an article onto a traveling carriage including the power generation control inverter determined to have the abnormality; a second reset instructing step of providing, by the control device, an instruction to reset the power generation control inverter on which the control for prohibiting loading an article is performed in the second loading prohibition controlling step; a second record acquiring step of performing, when the control device determines that the control status of the power generating motor by the power generation control inverter is normal after the traveling carriage including the power generation control inverter instructed to cancel stopping the control of the power generating motor subjected to the reset instruction in the second reset instructing step makes a round of the path, control for permitting loading an article onto the traveling carriage including the power generation control inverter, and acquiring the abnormality record retained in the power generation control inverter; and a second abnormality record acquiring step of performing, when the control device determines again that the control status of the power generating motor by the power generation control inverter is abnormal after the traveling carriage including the power generation control inverter reset in the second reset instructing step makes a round of the path, control for prohibiting loading an article onto the traveling carriage including the power generation control inverter, and acquiring the abnormality record retained in the power generation control inverter; and a second abnormality determining step of determining, by the control device, an abnormality of the sorter device based on the abnormality record acquired in the second record acquiring step and the second abnormality record acquiring step.

In this method, in a case where the control device once provides an instruction for reset to the power generation control inverter that is determined to have an abnormality in the control status of the power generating motor while the traveling carriage is traveling and then determines the power generation control inverter to have an abnormality in the control status of the power generating motor again, the control device prohibits loading an article onto the traveling carriage including the power generation control inverter, acquires the abnormality record from the power generation control inverter, and determines the abnormality of the sorter device based on the acquired abnormality record.

According to the sorting facility and the status checking method for a traveling carriage according to the present invention, in a case where a control unit that is determined to have an abnormality in the control status of a sorter device while a traveling carriage is traveling is once reset and then determined to have an abnormality in the control status of the sorter device again, loading an article onto the traveling carriage including the control unit is prohibited, and an abnormality record is acquired from the control unit. Therefore, a cause of the abnormality of the sorter device can be identified based on the acquired abnormality record without stopping the traveling of the traveling carriage. Since the cause of the abnormality of the sorter device can be identified while the traveling carriage is traveling, measures appropriate for the cause of the abnormality can be taken quickly after the traveling carriage is stopped for mainte-nance. Therefore, the time taken for the maintenance can be reduced. For that reason, the operation of loading articles onto sorter devices can be performed efficiently.

In a case where a temporary, minor abnormality occurs in the control unit, the control unit is reset. Thus, the controlling of the sorter device by the control unit will not be stopped unless an abnormality occurs again. Therefore, the operation of the sorter device will not be stopped every time any abnormality occurs in the control unit. The operation of loading an article onto a sorter device can be therefore performed on a traveling carriage unless the sorter device of the traveling carriage is completely unable to operate. Thus, the operation can be performed efficiently.

DETAILED DESCRIPTION OF THE INVENTION

A sorting facility 10 according to the present invention will be described. Note that the present invention is not limited to the sorting facility 10 described below.

Figure 1:
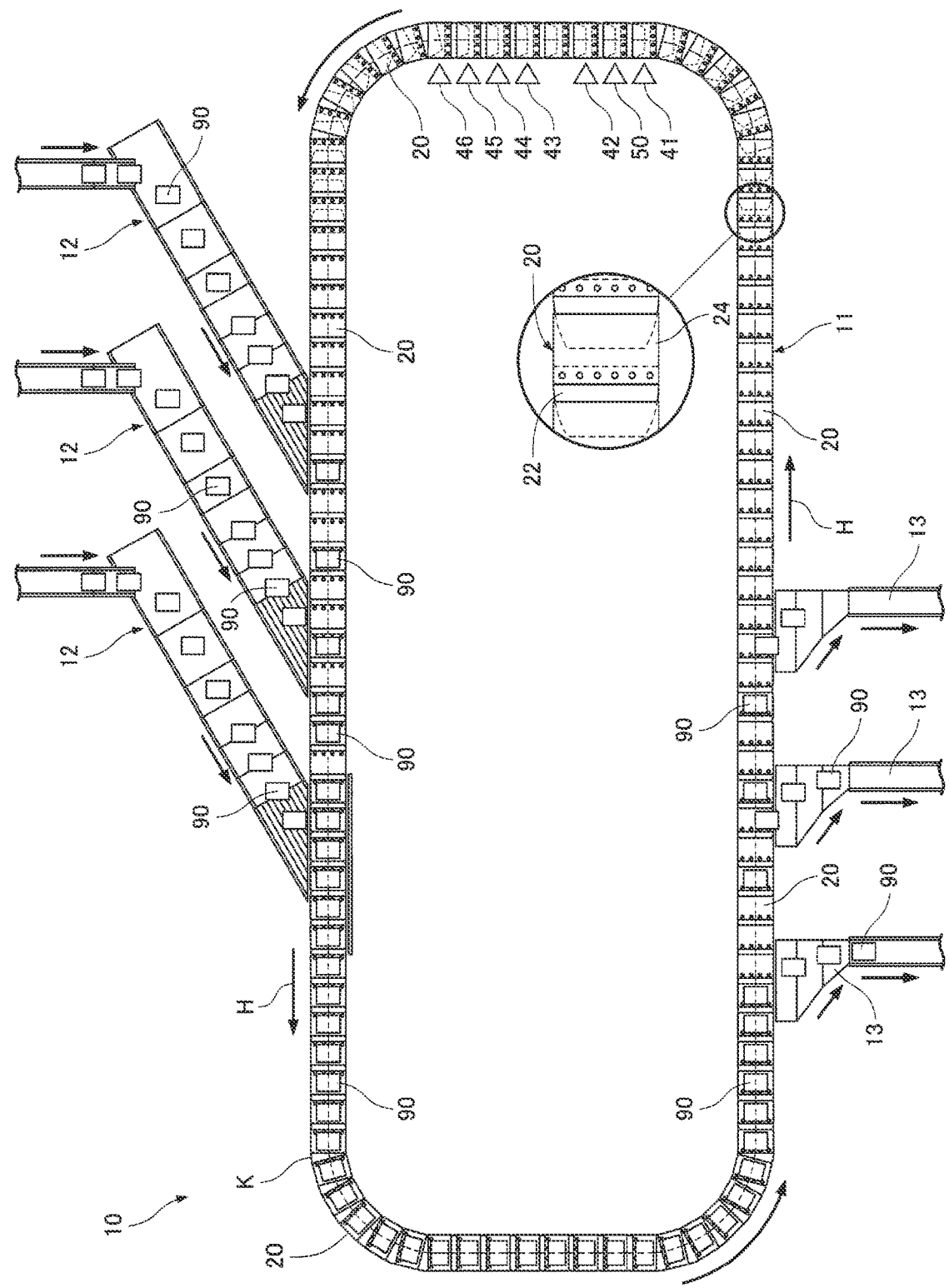
FIG. 1 is a schematic plan view of a sorting facility according to the present invention.

As illustrated in FIG. 1, in the sorting facility 10, a loop-shaped conveyance route K (an example of a "closed path") for conveying articles 90 is formed. The sorting facility 10 mainly includes a main conveyor system 11 that circulates and conveys articles 90 along the conveyance route K, a plurality of induction conveyors 12 that load articles 90 onto the conveyance route K on the main conveyor system 11, a plurality of chutes 13 that receive articles 90 unloaded from the conveyance route K on the main conveyor system 11.

In the sorting facility 10, articles 90 are loaded from specified induction conveyors 12 onto traveling carriages 20 that travel along rails 14 (FIG. 2) of the main conveyor system 11. The articles 90 loaded onto the traveling carriages 20 are conveyed along the conveyance route K. The articles 90 conveyed by the traveling carriages 20 are, for example, unloaded onto chutes 13 assigned to stores, so as to be sorted for each store.

Pieces of equipment of the sorting facility 10 (the main conveyor system 11, the induction conveyors 12, and the chutes 13) are connected to a supervisory controller 40 that controls the entire sorting facility 10 (see FIG. 3) and controlled by the supervisory controller 40.

As illustrated in FIG. 1, in the main conveyor system 11, traveling carriages 20 on which articles 90 are placed travel on the rails 14. The articles 90 are thus conveyed along the conveyance route K.

The induction conveyors 12 load articles 90 onto conveyor belts 23 (an example of "sorter devices") of traveling carriages 20 traveling along the conveyance route K. A plurality of (three in FIG. 1) induction conveyors 12 are disposed side by side along the conveyance route K. For each of the induction conveyor 12, traveling carriages 20 onto which articles 90 are to be loaded are searched for and determined in advance. Each induction conveyor 12 loads articles 90 onto specified traveling carriages 20 determined for the induction conveyor 12.

The chutes 13 receive articles 90 unloaded from traveling carriages 20 and convey the received articles 90 to another downstream facility (e.g., shipment facility) or directly to a vehicle (e.g., truck) or the like. A plurality of (three in FIG. 1) chutes 13 are arranged side by side along the conveyance route K. Each chute 13 receives articles 90 that are determined for the chute 13 in advance from traveling carriages 20.

Next, a traveling carriage 20 traveling on the conveyance route K will be described.

Figure 2:
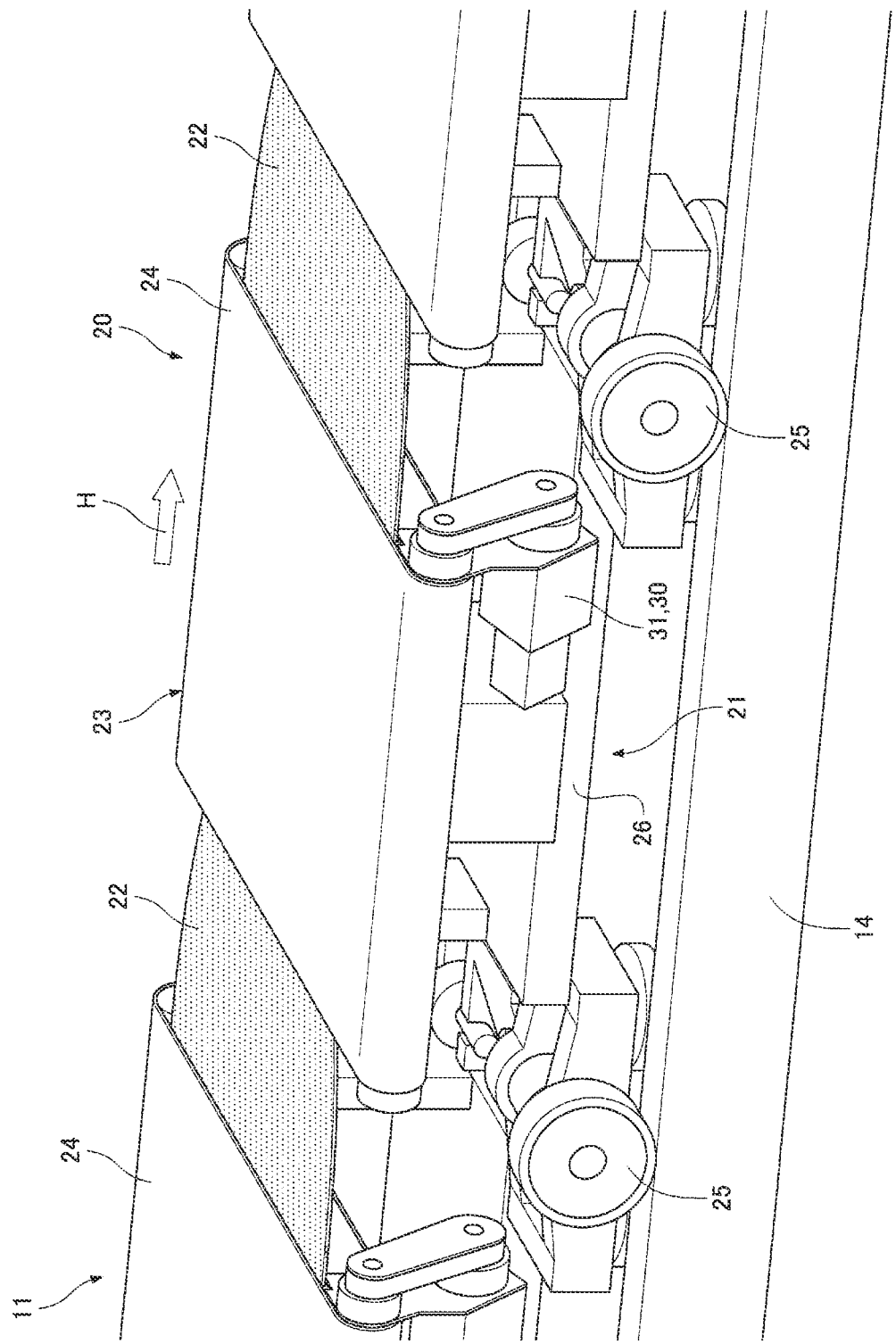
FIG. 2 is a perspective view of a traveling carriage traveling in the sorting facility according to the present invention.

As illustrated in FIG. 1 and FIG. 2, a traveling carriage 20 receives an article 90 loaded from a specified induction conveyor 12. The traveling carriage 20 conveys the received articles 90 along the conveyance route K and unload the article 90 to a specified chute 13. The traveling carriage 20 is coupled to adjacent traveling carriages 20 on the conveyance route K and travels on the rails 14 while being lined up with the adjacent traveling carriages 20.

The traveling carriages 20 each mainly include a body 21 that travels on the rails 14, a cover 22 with which a gap between the traveling carriage 20 and a neighboring traveling carriage 20 is covered, a conveyor belt 23 on which an article 90 is placed and supported, and a driving device 30 that drives the conveyor belt 23.

As illustrated in FIG. 2, the body 21 mainly includes wheels 25 for traveling on the rails 14, and a frame 26 that supports the conveyor belt 23, the wheels 25, the driving device 30, and the like.

The cover 22 is formed of a plate-shaped member that closes a gap between traveling carriages 20 adjacent to each other on the conveyance route K. The cover 22 is fixed to a rear end portion of the traveling carriage 20 (an end portion on a rear side of the traveling carriage 20 in a traveling direction H of the traveling carriage 20).

The conveyor belt 23 is provided at an upper portion of the body 21. In the conveyor belt 23, a belt 24 is driven by the driving device 30. Thus, an article 90 placed on the belt 24 is conveyed in a direction horizontally perpendicular to the traveling direction H of the traveling carriage 20. When the traveling carriage 20 arrives at a specified chute 13, in the conveyor belt 23, the belt 24 is driven by the driving device 30. Thus, an article 90 placed on the belt 24 is discharged toward a position of the chute 13. In the conveyor belt 23, when an article 90 deviates from an appropriate position on the belt 24 while the article 90 is being conveyed by the traveling carriage 20, the belt 24 is driven by the driving device 30 to adjust the placement of the article 90 to a proper position.

Figure 3:
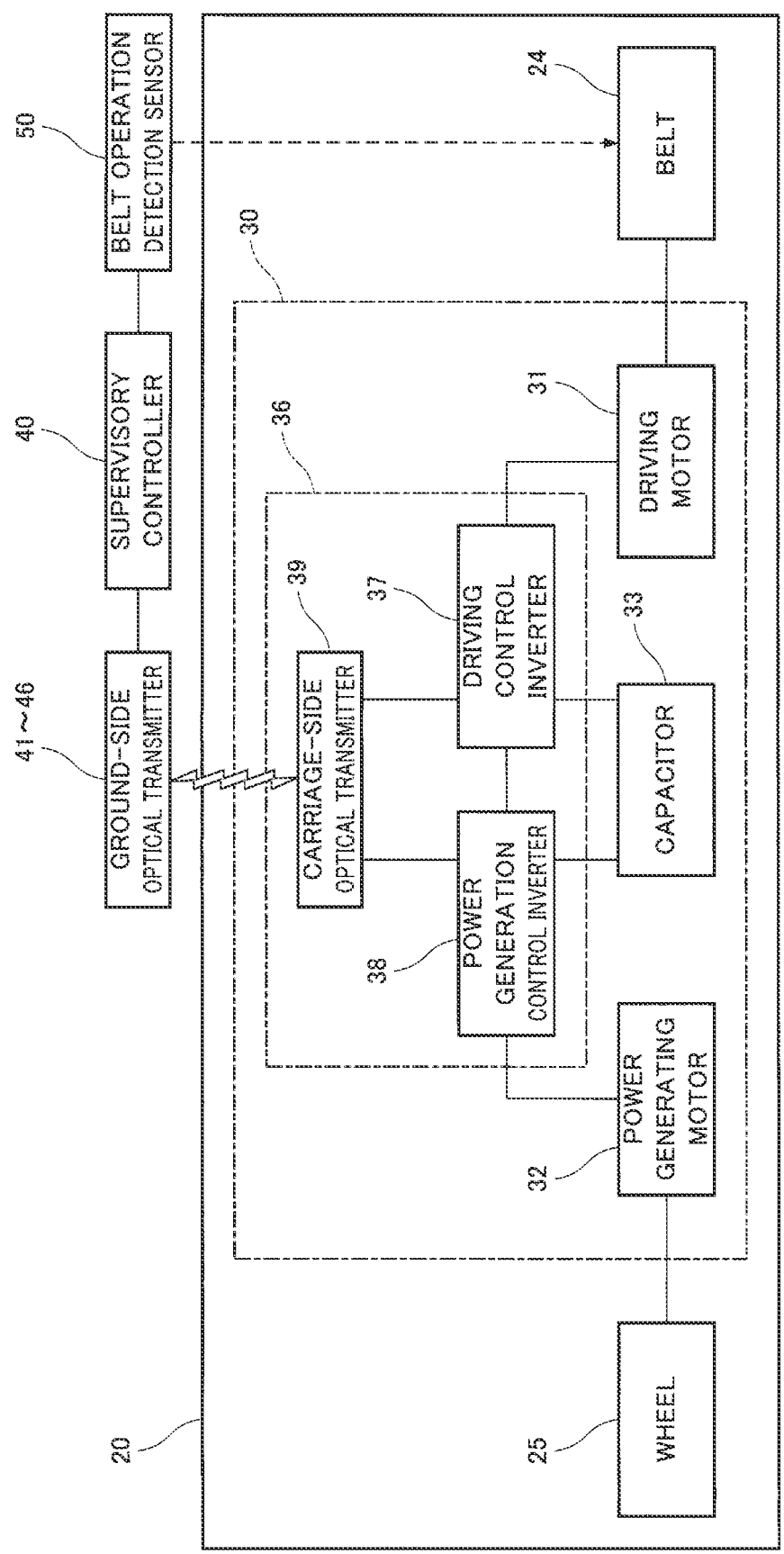
FIG. 3 is a block diagram illustrating a control configuration of a traveling carriage traveling in the sorting facility according to the present invention.

As illustrated in FIG. 2 and FIG. 3, the driving device 30 mainly includes a driving motor 31 that drives the belt 24 of the conveyor belt 23, a power generating motor 32 that generates electric power for driving the belt 24 of the conveyor belt 23, a capacitor 33 that stores the electric power generated by the power generating motor 32, and a control unit 36 that controls the conveyor belt 23 by controlling the driving motor 31, the power generating motor 32, and the capacitor 33.

The driving motor 31 includes, for example, a sensorless servomotor. The driving motor 31 is connected to the conveyor belt 23 and drives the belt 24 of the conveyor belt 23. The driving motor 31 is connected to the control unit 36, and a rotational speed of the driving motor 31 is controlled by the control unit 36.

The power generating motor 32 includes, for example, a sensorless servomotor. The power generating motor 32 is connected to a wheel 25 of the traveling carriage 20. Rotation of the wheel 25 rotates a rotating shaft of the power generating motor 32. The power generating motor 32 thus generates electric power. The power generating motor 32 is connected to a power generation control inverter 38. The power generation control inverter 38 controls a required torque of the power generating motor 32.

The capacitor 33 is connected to the driving motor 31 and the power generating motor 32 via the control unit 36. The capacitor 33 stores electric power generated by the power generating motor 32 and supplies the stored electric power to the driving motor 31.

As illustrated in FIG. 3, the control unit 36 includes a driving control inverter 37 for controlling the driving motor 31, the power generation control inverter 38 for controlling the power generating motor 32, and a carriage-side optical transmitter 39 that exchanges signals with ground-side optical transmitters 41, 42, 43, 44, 45, and 46 that are provided on a ground side.

The driving control inverter 37 is connected to the driving motor 31 and controls the rotational speed of the driving motor 31. The driving control inverter 37 is connected to the capacitor 33 and controls electric power supplied from the capacitor 33 to the driving motor 31.

The power generation control inverter 38 is connected to the power generating motor 32 and controls the required torque of the power generating motor 32. The power generation control inverter 38 is connected to the capacitor 33 and controls electric power that is generated by the power generating motor 32 to be stored in the capacitor 33.

The driving control inverter 37 and the power generation control inverter 38 each have a self-maintenance function against overcurrent and overheating (an example of "abnormality in controlling a conveyor belt (sorter device)"). Specifically, the driving control inverter 37 and the power generation control inverter 38 each include an overcurrent detection circuit (not illustrated) and an overheating detection circuit (not illustrated) that are self-protection circuits. When the overcurrent detection circuit detects overcurrent, or the overheating detection circuit detects overheating, the driving control inverter 37 or the power generation control inverter 38 outputs an abnormality code for the overcurrent or the overheating and stops operation of the entire inverter. The driving control inverter 37 or the power generation control inverter 38 outputs the abnormality code to the supervisory controller 40 on the ground side. When the supervisory controller 40 determines based on the abnormality code that an abnormality has occurred in the driving control inverter 37 or the power generation control inverter 38, the driving control inverter 37 or the power generation control inverter 38 retains the output abnormality code as an abnormality record.

The carriage-side optical transmitter 39 is fixed to the frame 26 of the body 21 (FIG. 2). The carriage-side optical transmitter 39 uses optical transmission to exchange signals with the ground-side optical transmitters 41, 42, 43, 44, 45, and 46 provided on the ground side. The carriage-side optical transmitter 39 is connected to the driving control inverter 37 and the power generation control inverter 38.

The carriage-side optical transmitter 39 transmits signals from the ground-side optical transmitters 41, 42, 43, 44, 45, and 46 to the driving control inverter 37 and the power generation control inverter 38. The carriage-side optical transmitter 39 transmits signals from the driving control inverter 37 and the power generation control inverter 38 to the ground-side optical transmitters 41, 42, 43, and 44.

As illustrated in FIG. 1 and FIG. 3, the traveling of the traveling carriage 20 and the operation of the conveyor belt 23 (driving device 30) are controlled by the supervisory controller 40 (an example of "control device"), which is provided on the ground side (independently of the traveling carriage 20) and controls the entire sorting facility 10. Note that the traveling carriages 20 are not limited to traveling carriages controlled directly by the supervisory controller 40 that controls the entire sorting facility 10 and may be traveling carriages controlled by a controller that is subordinate to the supervisory controller 40.

The supervisory controller 40 is connected to the ground-side optical transmitters 41, 42, 43, 44, 45, and 46 that exchanges signals with the carriage-side optical transmitter 39. Via the ground-side optical transmitters 41, 42, 43, 44, 45, and 46, the supervisory controller 40 provides instructions to the traveling carriages 20 and receives signals from the traveling carriages 20. That is, the supervisory controller 40 controls the traveling carriages 20 using optical transmission (wirelessly).

The ground-side optical transmitters 41, 42, 43, 44, 45, and 46 are devices that perform optical transmission with the carriage-side optical transmitter 39 of each traveling carriage 20. The ground-side optical transmitters 41, 42, 43, 44, 45, and 46 are provided along the conveyance route K. Specifically, the ground-side optical transmitters 41, 42, 43, 44, 45, and 46 are provided to a support frame for the rails 14 (FIG. 2) that is attached between a position where a most downstream chute 13 on the conveyance route K of the three chutes 13 is disposed and a position where a most upstream induction conveyor 12 on the conveyance route K of the three induction conveyors 12 is disposed. The ground-side optical transmitters 41, 42, 43, 44, 45, and 46 are disposed in an order of, from a side on which the most downstream chute 13 is disposed (from an upstream side on the conveyance route K), a first ground-side optical transmitter 41, a second ground-side optical transmitter 42, a third ground-side optical transmitter 43, a fourth ground-side optical transmitter 44, a fifth ground-side optical transmitter 45, and a sixth ground-side optical transmitter 46. When the traveling carriage 20 passes by the ground-side optical transmitters 41, 42, 43, 44, 45, and 46, the ground-side optical transmitters 41, 42, 43, 44, 45, and 46 transmit signals from the supervisory controller 40 to a carriage-side optical transmitter 39 or receive a signal from the carriage-side optical transmitter 39.

The first ground-side optical transmitter 41 transmits, to the carriage-side optical transmitter 39, an instruction signal for causing a driving control inverter 37 to send information about the control status of the driving motor 31 (an example of "information about the control status of a conveyor belt (sorter device)") to the supervisory controller 40 as a response and receives, from the carriage-side optical transmitter 39, a signal of the information about the control status of the driving motor 31 sent from the driving control inverter 37 as a response. Here, the information about the control status of the driving motor 31 refers to information as to whether the driving control inverter 37 is controlling the driving motor 31 normally.

The second ground-side optical transmitter 42 transmits, to the carriage-side optical transmitter 39, an instruction signal for causing a power generation control inverter 38 to send information about the control status of the power generating motor 32 (an example of "information about the control status of the conveyor belt (sorter device)") to the supervisory controller 40 as a response and receives, from the carriage-side optical transmitter 39, a signal of the information about the control status of the power generating motor 32 sent from the power generation control inverter 38 as a response. Here, the information about the control status of the power generating motor 32 refers to information as to whether the power generation control inverter 38 is controlling the power generating motor 32 normally.

The third ground-side optical transmitter 43 transmits, to the carriage-side optical transmitter 39, an instruction signal for collecting an abnormality record from the driving control inverter 37 and an instruction signal for resetting the driving control inverter 37 (performing inverter reset) and receives the abnormality record transmitted from the driving control inverter 37. Here, the resetting of the driving control inverter 37 refers to recovering the operation of the entire driving control inverter 37 that has been stopped by the self-maintenance function of the driving control inverter 37.

The fourth ground-side optical transmitter 44 transmits, to the carriage-side optical transmitter 39, an instruction signal for collecting an abnormality record from the power generation control inverter 38 and an instruction signal for resetting the power generation control inverter 38 (performing inverter reset) and receives the abnormality record transmitted from the power generation control inverter 38. Here, the resetting of the power generation control inverter 38 refers to recovering the operation of the entire power generation control inverter 38 that has been stopped by the self-maintenance function of the power generation control inverter 38.

The fifth ground-side optical transmitter 45 transmits, to the carriage-side optical transmitter 39, an instruction signal for deleting an abnormality record retained in the driving control inverter 37.

The sixth ground-side optical transmitter 46 transmits, to the carriage-side optical transmitter 39, an instruction signal for deleting an abnormality record retained in the power generation control inverter 38.

As illustrated in FIG. 1 and FIG. 3, on a downstream side on the conveyance route K where the first ground-side optical transmitter 41 is disposed, a belt operation detection sensor 50 for detecting rotation of a belt 24 of a conveyor belt 23 (an example of a "sensor") is provided. The belt operation detection sensor 50 is provided to the support frame for the rails 14. When a traveling carriage 20 passes by the belt operation detection sensor 50, the belt operation detection sensor 50 detects rotation of a belt 24 of a conveyor belt 23. The belt operation detection sensor 50 is connected to the supervisory controller 40. Upon detecting rotation of a belt 24 of a conveyor belt 23 is detected, the belt operation detection sensor 50 transmits a detection signal to the supervisory controller 40.

Next, a status checking method for a traveling carriage 20 in the sorting facility 10 will be described.

In the sorting facility 10, a status of a traveling carriage 20 is checked based on an abnormality record retained in a driving control inverter 37 and a power generation control inverter 38 and based on a result of the detection performed by the belt operation detection sensor 50. Based on the checking, whether an article 90 can be loaded onto the traveling carriage 20 being checked is determined.

To check the status of the traveling carriage 20, whether the status of the conveyor belt 23 is normal is determined. In a case where a result of the determination shows that the status of the conveyor belt 23 is abnormal, whether the abnormality is a control abnormality (software abnormality) attributable to a control unit 36 (driving control inverter 37 and power generation control inverter 38) or a mechanical abnormality (hardware abnormality) attributable to a part other than the control unit 36 (e.g., conveyor belt 23 itself, driving motor 31, power generating motor 32) is determined.

In the sorting facility 10, the status of a traveling carriage 20 is checked while the traveling carriage 20 is traveling on the conveyance route K, without stopping the traveling carriage 20, by acquiring an abnormality record from a control unit 36 (driving control inverter 37 and power generation control inverter 38) of the traveling carriage 20 in traveling or by detecting whether a belt 24 of a conveyor belt 23 of the traveling carriage 20 in traveling is rotating. It is then determined whether the abnormality of the conveyor belt 23 is a control abnormality (software abnormality) or a mechanical abnormality (hardware abnormality).

As illustrated in FIG. 1, in the sorting facility 10, a traveling carriage 20 is checked for a control abnormality in a driving motor 31 attributable to a driving control inverter 37 by passing by the first ground-side optical transmitter 41, the third ground-side optical transmitter 43, and the fifth ground-side optical transmitter 45. The traveling carriage 20 is checked for a control abnormality in a power generating motor 32 attributable to a power generation control inverter 38 by passing by the second ground-side optical transmitter 42, the fourth ground-side optical transmitter 44, and the sixth ground-side optical transmitter 46. Moreover, the traveling carriage 20 is checked for a mechanical abnormality attributable to a belt 24 of a conveyor belt 23 by passing by the belt operation detection sensor 50.

By checking the status of the traveling carriage 20, it is determined whether the checked traveling carriage 20 is a traveling carriage onto which an article 90 can be loaded.

A method for the determination will be described below specifically.

First, a case where a traveling carriage 20 without an article 90 placed on a conveyor belt 23 is checked for a control abnormality of a driving motor 31 attributable to a driving control inverter 37 and a mechanical abnormality attributable to a belt 24 of the conveyor belt 23 will be described.

Figure 4:
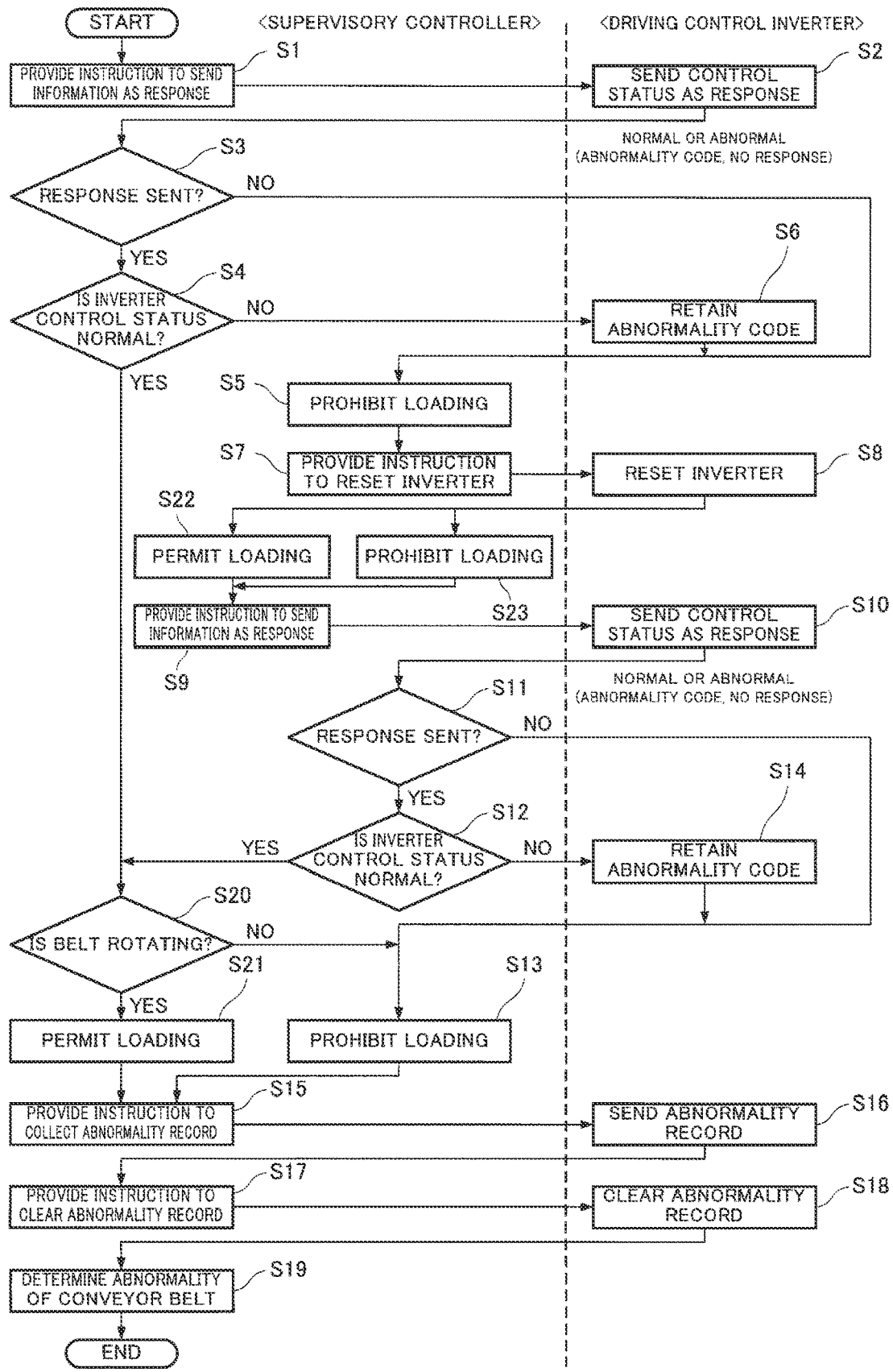
FIG. 4 is a flow chart of a case where a traveling carriage is checked for a control abnormality of a driving motor attributable to a driving control inverter and a mechanical abnormality attributable to a belt of a conveyor belt, in the sorting facility according to the present invention.

As illustrated in FIG. 1 and FIG. 4, when the traveling carriage 20 traveling on the conveyance route K passes by the first ground-side optical transmitter 41, the supervisory controller 40 instructs a driving control inverter 37 to send information about the control status of a driving motor 31 to the supervisory controller 40 as a response (S1, first information response instructing step) and to drive a conveyor belt 23 with the driving motor 31. At this time, an instruction signal is transmitted and received between the first ground-side optical transmitter 41 and a carriage-side optical transmitter 39. Receiving the instruction from the supervisory controller 40, the driving control inverter 37 sends the information about the control status of the driving motor 31 to the supervisory controller 40 as a response (S2, first information responding step). At this time, when the driving motor 31 is controlled normally, the driving control inverter 37 transmits a signal indicating the normality to the supervisory controller 40 via the first ground-side optical transmitter 41. When the driving motor 31 is not controlled normally (when the operation of the entire inverter is stopped by a self-protection circuit of the driving control inverter 37), the driving control inverter 37 transmits a predetermined abnormality code to the supervisory controller 40 via the first ground-side optical transmitter 41. In a case where the driving control inverter 37 itself is out of order, the driving control inverter 37 cannot send the response. Therefore, no signal is transmitted to the supervisory controller 40.

The supervisory controller 40 determines whether a response signal has been sent from the driving control inverter 37 within a predetermined time period (S3, first control status determining step). When it is determined that the response signal has been sent (S3—Yes), the supervisory controller 40 determines whether the driving control inverter 37 is controlling the driving motor 31 normally (S4, first control status determining step). In contrast, when it is determined that the response signal has not been sent (S3—No), the supervisory controller 40 determines that the operation of the entire driving control inverter 37 has been stopped, and prohibits loading an article 90 onto the traveling carriage 20 including this driving control inverter 37 (S5).

When it is determined that the response signal has been sent (S3—Yes) and determining that the driving control inverter 37 is not controlling the driving motor 31 normally (S4—No), the supervisory controller 40 determines that the operation of the entire driving control inverter 37 is temporarily stopped. The supervisory controller 40 then prohibits loading an article 90 onto the traveling carriage 20 including this driving control inverter 37 (S5, first loading prohibition controlling step). At this time, the supervisory controller 40 determines that the operation of the entire driving control inverter 37 has been stopped, based on an abnormality code transmitted from the driving control inverter 37. At the same time, the driving control inverter 37 retains the abnormality code as an abnormality record (S6, first abnormality record retaining step).

When it is determined that the response signal has been sent (S3—Yes) and determining that the driving control inverter 37 is controlling the driving motor 31 normally (S4—Yes), the supervisory controller 40 determines whether the belt 24 of the conveyor belt 23 is rotating, based on a detection signal from the belt operation detection sensor 50 (S20).

Upon prohibiting the loading of an article 90 onto the traveling carriage 20 (S5), the supervisory controller 40 instructs the driving control inverter 37 to perform the inverter reset (S7, first reset instructing step). At this time, an instruction signal is transmitted and received between the third ground-side optical transmitter 43 and the carriage-side optical transmitter 39. Being instructed to perform the inverter reset by the supervisory controller 40, the driving control inverter 37 performs the inverter reset (S8). This causes only a driving control inverter 37 capable of performing the inverter reset (S8) to operate to restart the controlling of the driving motor 31.

The traveling carriage 20 including the driving control inverter 37 that has performed the inverter reset makes a round of the conveyance route K. At this time, only when the driving control inverter 37 included in the traveling carriage 20 is caused to operate by the inverter reset (S8), the supervisory controller 40 permits loading of an article 90 onto the traveling carriage 20 (S22). When the driving control inverter 37 included in the traveling carriage 20 is not caused to operate by the inverter reset (S8), the supervisory controller 40 prohibits loading of an article 90 onto the traveling carriage 20 (S23).

When the traveling carriage 20 including the driving control inverter 37 that has performed the inverter reset makes a round of the conveyance route K and passes by the first ground-side optical transmitter 41 again, the supervisory controller 40 instructs the driving control inverter 37 to send information about the control status of the driving motor 31 to the supervisory controller 40 as a response (S9). At this time, an instruction signal is transmitted and received between the first ground-side optical transmitter 41 and a carriage-side optical transmitter 39. Receiving the instruction from the supervisory controller 40, the driving control inverter 37 sends the information about the control status of the driving motor 31 to the supervisory controller 40 as a response (S10).

The supervisory controller 40 determines whether a response signal has been sent from the driving control inverter 37 within the predetermined time period (S11). When it is determined that the response signal has been sent (S1—Yes), the supervisory controller 40 determines whether the driving control inverter 37 is controlling the driving motor 31 normally (S12). In contrast, when it is determined that the response signal has not been sent (S11—No), the supervisory controller 40 determines that the driving control inverter 37 itself has been out of order. The supervisory controller 40 then prohibits loading an article 90 onto the traveling carriage 20 including this driving control inverter 37 (S13) and determines that this traveling carriage 20 is a traveling carriage 20 of which a driving control inverter 37 is unable to recover.

When it is determined that the response signal has been sent (S11—Yes) and determining that the driving control inverter 37 is not controlling the driving motor 31 normally (S12—No), the supervisory controller 40 determines that the operation of the entire driving control inverter 37 has been stopped. The supervisory controller 40 then prohibits loading an article 90 onto the traveling carriage 20 including this driving control inverter 37 (S13) and determines that this traveling carriage 20 is a traveling carriage 20 of which a driving control inverter 37 is unable to recover. At this time, the driving control inverter 37 retains an abnormality code as an abnormality record (S14). When the traveling carriage 20 is determined by the supervisory controller 40 to be a traveling carriage 20 of which a driving control inverter 37 is unable to recover, the traveling carriage 20 is treated as a traveling carriage 20 onto which no article 90 can be loaded until the driving control inverter 37 is recovered.

The supervisory controller 40 instructs the driving control inverter 37 of the traveling carriage 20, for which loading an article 90 has been prohibited, to transmit an abnormality record retained in the driving control inverter 37 (abnormality record collection) (S15, first abnormality record acquiring step). At this time, an instruction signal is transmitted and received between the third ground-side optical transmitter 43 and the carriage-side optical transmitter 39. In accordance with the instruction to transmit an abnormality record, the driving control inverter 37 transmits the retained abnormality record to the supervisory controller 40 (S16).

Receiving the abnormality record from the driving control inverter 37, the supervisory controller 40 instructs the driving control inverter 37 to delete the abnormality record retained in the driving control inverter 37 (abnormality record clearance) (S17). In accordance with the instruction to delete the abnormality record, the driving control inverter 37 deletes the retained abnormality record (S18).

The supervisory controller 40 determines an abnormality of the conveyor belt 23 based on the abnormality record transmitted from the driving control inverter 37 (S19, first abnormality determining step).

Here, in a case where loading an article 90 onto the traveling carriage 20 including the driving control inverter 37 that has performed the inverter reset (S8) is prohibited again (S13) due to no response signal having been sent (S11—No), it is determined that the driving control inverter 37 itself of this traveling carriage 20 is unable to recover by the inverter reset.

In a case where loading an article 90 is prohibited (S13) because it is determined that the driving control inverter 37 is not controlling the driving motor 31 normally (S12—No), it is determined that the driving control inverter 37 provided in this traveling carriage 20 has stopped the operation of the entire inverter using the self-protection circuit.

In contrast, when it is determined that the response signal has been sent from the driving control inverter 37 within the predetermined time period (S11—Yes) and determining that the driving control inverter 37 is controlling the driving motor 31 normally (S12—Yes), the supervisory controller 40 determines whether the belt 24 of the conveyor belt 23 is rotating, based on a detection signal from the belt operation detection sensor 50 (S20).

When it is determined that the belt 24 of the conveyor belt 23 is rotating (S20—Yes), the supervisory controller 40 permits loading an article 90 onto this traveling carriage 20 (S21). The supervisory controller 40 then instructs the driving control inverter 37 to transmit an abnormality record retained in the driving control inverter 37 (abnormality record collection) (S15, first abnormality record acquiring step) and instructs the driving control inverter 37 to delete the abnormality record retained in the driving control inverter 37 (abnormality record clearance) (S17), as described thus far. In accordance with the instruction from the supervisory controller 40, the driving control inverter 37 transmits the retained abnormality record to the supervisory controller 40 (S16) and then deletes the retained abnormality record (S18).

In contrast, when it is determined that the belt 24 of the conveyor belt 23 is not rotating (S20—No), the supervisory controller 40 prohibits loading an article 90 onto this traveling carriage 20 (S13). The supervisory controller 40 then instructs the driving control inverter 37 to transmit the abnormality record retained in the driving control inverter 37 (abnormality record collection) (S15, first abnormality record acquiring step) and instructs the driving control inverter 37 to delete the abnormality record retained in the driving control inverter 37 (abnormality record clearance) (S17), as described thus far. The supervisory controller 40 further determines an abnormality of the conveyor belt 23 based on the abnormality record transmitted from the driving control inverter 37 (S19, first abnormality determining step). In this case, the supervisory controller 40 determines that the driving control inverter 37 is controlling the driving motor 31 normally, whereas the belt 24 of the conveyor belt 23 is not rotating. That is, this traveling carriage 20 is determined to have no abnormality in the driving control inverter 37 itself but have an abnormality in the conveyor belt 23 itself.

When it is determined that a response signal has been sent from the driving control inverter 37 within the predetermined time period (S3—Yes), determining that the driving control inverter 37 is controlling the driving motor 31 normally (S4—Yes), further determining whether the belt 24 of the conveyor belt 23 is rotating (S20), and determining that the belt 24 of the conveyor belt 23 is rotating (S20—Yes), the supervisory controller 40 permits loading an article 90 onto this traveling carriage 20 (S21). The supervisory controller 40 then instructs the driving control inverter 37 to transmit an abnormality record (S15) and instructs the driving control inverter 37 to delete the abnormality record (abnormality record clearance) (S17), as described thus far. In accordance with the instruction from the supervisory controller 40, the driving control inverter 37 transmits the retained abnormality record to the supervisory controller 40 (S16) and then deletes the retained abnormality record (S18).

When it is determined that a response signal has been sent from the driving control inverter 37 within the predetermined time period (S3—Yes), determining that the driving control inverter 37 is controlling the driving motor 31 normally (S4—Yes), further determining whether the belt 24 of the conveyor belt 23 is rotating (S20), and determining that the belt 24 of the conveyor belt 23 is not rotating (S20—No), the supervisory controller 40 prohibits loading an article 90 onto this traveling carriage 20 (S13). The supervisory controller 40 then instructs the driving control inverter 37 to transmit an abnormality record (S15) and instructs the driving control inverter 37 to delete the abnormality record (abnormality record clearance) (S17), as described thus far. The supervisory controller 40 further determines an abnormality of the conveyor belt 23 based on the abnormality record transmitted from the driving control inverter 37 (S19). In this case, the supervisory controller 40 determines that the driving control inverter 37 is controlling the driving motor 31 normally, whereas the belt 24 of the conveyor belt 23 is not rotating. That is, this traveling carriage 20 is determined to have no abnormality in the driving control inverter 37 itself but have an abnormality in the conveyor belt 23 itself.

Next, a case where a traveling carriage 20 with an article 90 placed on a conveyor belt 23 is checked for a control abnormality attributable to a driving control inverter 37 and a mechanical abnormality attributable to a belt 24 of the conveyor belt 23 will be described.

In this case, since the article 90 is placed on the conveyor belt 23, the supervisory controller 40 does not determine whether the belt 24 of the conveyor belt 23 is rotating, based on a detection signal from the belt operation detection sensor 50. Specifically, as illustrated in FIG. 4, when it is determined that a response signal has been sent from the driving control inverter 37 within the predetermined time period (S3—Yes, S11—Yes) and determining that the driving control inverter 37 is controlling the driving motor 31 normally (S4—Yes, S12—Yes), the supervisory controller 40 permits loading an article 90 onto the traveling carriage 20 (S21) based on the detection signal from the belt operation detection sensor 50, without determining whether the belt 24 of the conveyor belt 23 is rotating (S20). Other steps are the same as the case of the traveling carriage 20 without an article 90 placed on the conveyor belt 23. Therefore, the description of the other steps will be omitted.

Next, a case where a traveling carriage 20 is checked for a control abnormality of a power generating motor 32 attributable to a power generation control inverter 38 will be described. This checking is performed without alteration irrespective of whether an article 90 is placed on a conveyor belt 23.

Figure 5:
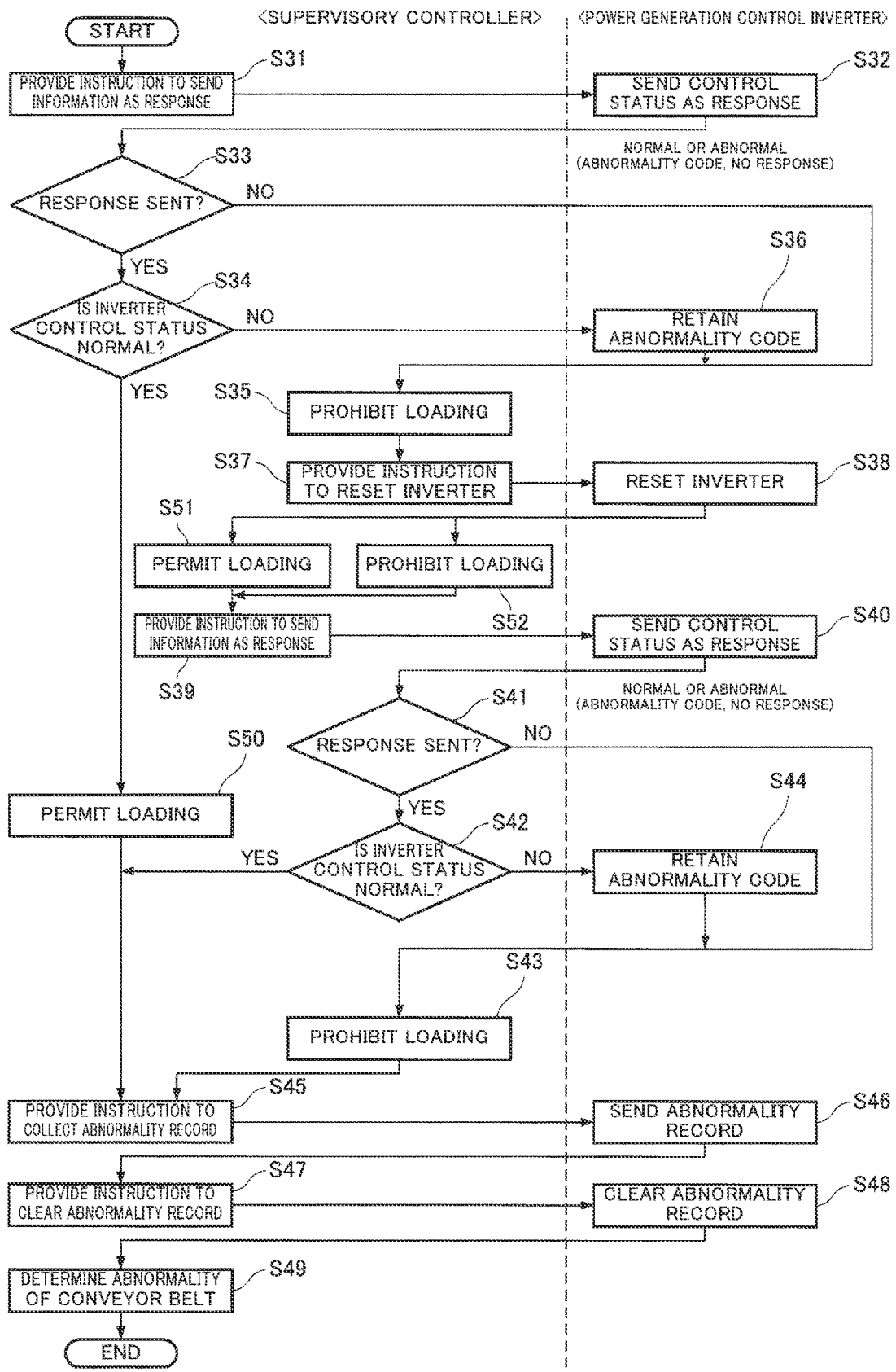
FIG. 5 is a flow chart of a case where a traveling carriage is checked for a control abnormality of a power generating motor attributable to a power generation control inverter, in the sorting facility according to the present invention.

As illustrated in FIG. 1 and FIG. 5, when the traveling carriage 20 traveling on the conveyance route K passes by the second ground-side optical transmitter 42, the supervisory controller 40 instructs a power generation control inverter 38 to send information about the control status of a power generating motor 32 to the supervisory controller 40 as a response (S31, second information response instructing step). At this time, an instruction signal is transmitted and received between the second ground-side optical transmitter 42 and a carriage-side optical transmitter 39. Receiving the instruction from the supervisory controller 40, the power generation control inverter 38 sends the information about the control status of the power generating motor 32 to the supervisory controller 40 as a response (S32, second information responding step). At this time, when the power generating motor 32 is controlled normally, the power generation control inverter 38 transmits a signal indicating the normality to the supervisory controller 40 via the second ground-side optical transmitter 42. When the power generating motor 32 is not controlled normally (when the operation of the entire inverter is stopped by a self-protection circuit of the power generation control inverter 38), the power generation control inverter 38 transmits a predetermined abnormality code to the supervisory controller 40 via the second ground-side optical transmitter 42. In a case where the power generation control inverter 38 itself is out of order, the power generation control inverter 38 cannot send the response. Therefore, no signal is transmitted to the supervisory controller 40.

The supervisory controller 40 determines whether a response signal has been sent from the power generation control inverter 38 within a predetermined time period (S33, second control status determining step). When it is determined that the response signal has been sent (S33—Yes), the supervisory controller 40 determines whether the power generation control inverter 38 is controlling the power generating motor 32 normally (S34, second control status determining step). In contrast, when it is determined that the response signal has not been sent (S33—No), the supervisory controller 40 determines that the operation of the entire power generation control inverter 38 has been stopped, and prohibits loading an article 90 onto the traveling carriage 20 including this power generation control inverter 38 (S35).

In contrast, when it is determined that the response signal has been sent (S33—Yes) and determining that the power generation control inverter 38 is not controlling the power generating motor 32 normally (S34—No), the supervisory controller 40 determines that the operation of the entire power generation control inverter 38 is being temporarily stopped, and prohibits loading an article 90 onto the traveling carriage 20 including this power generation control inverter 38 (S35, second loading prohibition controlling step). At this time, the supervisory controller 40 determines that the operation of the entire power generation control inverter 38 has been stopped, based on an abnormality code transmitted from the power generation control inverter 38. At the same time, the power generation control inverter 38 retains the abnormality code as an abnormality record (S36, second abnormality record retaining step).

When it is determined that the response signal has been sent (S33—Yes) and determining that the power generation control inverter 38 is controlling the power generating motor 32 normally (S34—Yes), the supervisory controller 40 permits loading an article 90 onto this traveling carriage 20 (S50).

Upon prohibiting the loading of an article 90 onto the traveling carriage 20 (S35), the supervisory controller 40 instructs the power generation control inverter 38 to perform the inverter reset (S37, second reset instructing step). At this time, an instruction signal is transmitted and received between the fourth ground-side optical transmitter 44 and the carriage-side optical transmitter 39. Being instructed to perform the inverter reset by the supervisory controller 40, the power generation control inverter 38 performs the inverter reset (S38). This causes only a power generation control inverter 38 capable of performing the inverter reset (S38) to operate to restart the controlling of the power generating motor 32.

The traveling carriage 20 including the power generation control inverter 38 that has performed the inverter reset makes a round of the conveyance route K. At this time, only when the power generation control inverter 38 included in the traveling carriage 20 is caused to operate by the inverter reset (S38), the supervisory controller 40 permits loading of an article 90 onto the traveling carriage 20 (S51). When the power generation control inverter 38 included in the traveling carriage 20 is not caused to operate by the inverter reset (S38), the supervisory controller 40 prohibits loading of an article 90 onto the traveling carriage 20 (S52).

When the traveling carriage 20 including the power generation control inverter 38 that has performed the inverter reset makes a round of the conveyance route K and passes by the second ground-side optical transmitter 42 again, the supervisory controller 40 instructs the power generation control inverter 38 to send information about the control status of the power generating motor 32 to the supervisory controller 40 as a response (S39). At this time, an instruction signal is transmitted and received between the second ground-side optical transmitter 42 and a carriage-side optical transmitter 39. Receiving the instruction from the supervisory controller 40, the power generation control inverter 38 sends the information about the control status of the power generating motor 32 to the supervisory controller 40 as a response (S40).

The supervisory controller 40 determines whether a response signal has been sent from the power generation control inverter 38 within a predetermined time period (S41). When it is determined that the response signal has been sent (S41—Yes), the supervisory controller 40 determines whether the power generation control inverter 38 is controlling the power generating motor 32 normally (S42). In contrast, when it is determined that the response signal has not been sent (S41—No), the supervisory controller 40 determines that the power generation control inverter 38 itself has been out of order. The supervisory controller 40 then prohibits loading an article 90 onto the traveling carriage 20 including this power generation control inverter 38 (S43) and determines that this traveling carriage 20 is a traveling carriage 20 of which a power generation control inverter 38 is unable to recover.

In contrast, when it is determined that the response signal has been sent (S41—Yes) and determining that the power generation control inverter 38 is not controlling the power generating motor 32 normally (S42—No), the supervisory controller 40 determines that the operation of the entire power generation control inverter 38 has been stopped, prohibits loading an article 90 onto the traveling carriage 20 including this power generation control inverter 38 (S43), and determines that this traveling carriage 20 is a traveling carriage 20 of which a power generation control inverter 38 is unable to recover. At this time, the power generation control inverter 38 retains an abnormality code as an abnormality record (S44). When the traveling carriage 20 is determined by the supervisory controller 40 to be a traveling carriage 20 of which a power generation control inverter 38 is unable to recover, the traveling carriage 20 is treated as a traveling carriage 20 onto which no article 90 can be loaded until the power generation control inverter 38 is recovered.

The supervisory controller 40 instructs the power generation control inverter 38 of the traveling carriage 20, for which loading an article 90 has been prohibited, to transmit an abnormality record retained in the power generation control inverter 38 (abnormality record collection) (S45, second abnormality record acquiring step). At this time, an instruction signal is transmitted and received between the fourth ground-side optical transmitter 44 and the carriage-side optical transmitter 39. In accordance with the instruction to transmit an abnormality record, the power generation control inverter 38 transmits the retained abnormality record to the supervisory controller 40 (S46).

Receiving the abnormality record from the power generation control inverter 38, the supervisory controller 40 instructs the power generation control inverter 38 to delete the abnormality record retained in the power generation control inverter 38 (abnormality record clearance) (S47). In accordance with the instruction to delete the abnormality record, the power generation control inverter 38 deletes the retained abnormality record (S48).

In contrast, when it is determined that the response signal has been sent from the power generation control inverter 38 within the predetermined time period (S41—Yes) and determining that the power generation control inverter 38 is controlling the power generating motor 32 normally (S42—Yes), the supervisory controller 40 instructs the power generation control inverter 38 to transmit the abnormality record retained in the power generation control inverter 38 (abnormality record collection) (S45, second record acquiring step) and instructs the power generation control inverter 38 to delete the abnormality record retained in the power generation control inverter 38 (abnormality record clearance) (S47). In accordance with the instruction from the supervisory controller 40, the power generation control inverter 38 transmits the retained abnormality record to the supervisory controller 40 (S46) and then deletes the retained abnormality record (S48).

When it is determined that the response signal has been sent from the power generation control inverter 38 within the predetermined time period (S33—Yes), determining that the power generation control inverter 38 is controlling the power generating motor 32 normally (S34—Yes), and permitting loading an article 90 onto the traveling carriage 20 (S50), the supervisory controller 40 instructs the power generation control inverter 38 to transmit the abnormality record retained in the power generation control inverter 38 (abnormality record collection) (S45) and instructs the power generation control inverter 38 to delete the abnormality record retained in the power generation control inverter 38 (abnormality record clearance) (S47), as described thus far. In accordance with the instruction from the supervisory controller 40, the power generation control inverter 38 transmits the retained abnormality record to the supervisory controller 40 (S46) and then deletes the retained abnormality record (S48).

The supervisory controller 40 determines an abnormality of the conveyor belt 23 based on the abnormality record transmitted from the power generation control inverter 38 (S49, second abnormality determining step).

Here, in a case where loading an article 90 onto the traveling carriage 20 including the power generation control inverter 38 that has performed the inverter reset (S38) is prohibited again (S43) due to no response signal having been sent (S41—No), it is determined that the power generation control inverter 38 itself of this traveling carriage 20 is in a state of being unable to recover by the inverter reset.

In a case where loading an article 90 is prohibited (S43) because it is determined that the power generation control inverter 38 is not controlling the power generating motor 32 normally (S42—No), it is determined that the power generation control inverter 38 provided in this traveling carriage 20 has stopped the operation of the entire inverter using the self-protection circuit.

Thus, according to the present embodiment, in a case where a control unit 36 that is determined to have an abnormality in the control status of a conveyor belt 23 while a traveling carriage 20 is traveling is once reset and then determined to have an abnormality in the control status of the conveyor belt 23 again, loading an article 90 onto a traveling carriage 20 including the control unit 36 is prohibited, and an abnormality record is acquired from the control unit 36. Therefore, a cause of the abnormality of the conveyor belt 23 can be identified based on the acquired abnormality record while the traveling carriage 20 is traveling, without stopping the traveling of the traveling carriage 20. Since the cause of the abnormality of the conveyor belt 23 can be identified while the traveling carriage 20 is traveling, measures appropriate for the cause of the abnormality can be taken quickly after the traveling carriage 20 is stopped for maintenance. Therefore, the time taken for the maintenance can be reduced. In this manner, the operation of loading an article 90 onto a conveyor belt 23 can be performed efficiently.

In a case where a temporary, minor abnormality occurs in a control unit 36, the control unit 36 is reset. Thus, the controlling of the conveyor belt 23 by the control unit 36 will not be stopped unless an abnormality occurs again. Therefore, the operation of the conveyor belt 23 will not be stopped every time any abnormality occurs in the control unit 36. The operation of loading an article 90 onto a conveyor belt 23 can be therefore performed on a traveling carriage 20 unless the conveyor belt 23 of the traveling carriage 20 is completely unable to operate. Thus, the operation can be performed efficiently.

In the present embodiment, the six ground-side optical transmitters are disposed along the conveyance route K in the order of, the first ground-side optical transmitter 41, the second ground-side optical transmitter 42, the third ground-side optical transmitter 43, the fourth ground-side optical transmitter 44, the fifth ground-side optical transmitter 45, and the sixth ground-side optical transmitter 46. However, the present invention is not limited to the order. For example, the first ground-side optical transmitter 41 may be disposed to rearward (downstream) of the second ground-side optical transmitter 42, the third ground-side optical transmitter 43 may be disposed to rearward (downstream) of the fourth ground-side optical transmitter 44, and the fifth ground-side optical transmitter 45 may be disposed to rearward (downstream) of the sixth ground-side optical transmitter 46.

In the present embodiment, a driving control inverter 37 and a power generation control inverter 38 exchange signals with the supervisory controller 40 controlling the entire sorting facility 10. However, the present invention is not limited to this. The driving control inverter 37 and the power generation control inverter 38 may exchange the signals with a subordinate controller controlled by the supervisory controller 40 (e.g., a controller that controls traveling of a traveling carriage 20).

In the present embodiment, after determining that the driving control inverter 37 is controlling the driving motor 31 normally (S4—Yes, S12—Yes), the supervisory controller 40 determines whether the belt 24 of the conveyor belt 23 is rotating (S20). However, the present invention is not limited to this. After determining that the driving control inverter 37 is controlling the driving motor 31 normally (S4—Yes, S12—Yes), the supervisory controller 40 may provide an instruction to transmit the abnormality record retained in the driving control inverter 37 (abnormality record collection) (S15) without determining whether the belt 24 of the conveyor belt 23 is rotating (S20).

In the present embodiment, a sorter device for sorting an article 90 in a traveling carriage 20 includes a conveyor belt 23. However, the present invention is not limited to this. Provided that an article 90 can be sorted in the traveling carriage 20, the sorter device may include, for example, a tilt tray sorter or the like.

REFERENCE SIGNS LIST

10 sorting facility
20 traveling carriage
23 conveyor belt (sorter device)
30 driving device
31 driving motor
32 power generating motor
36 control unit
37 driving control inverter
38 power generation control inverter
40 supervisory controller (control device)
50 belt operation detection sensor (sensor)
90 article
K conveyance route (closed path)

What is claimed is:

1. A sorting facility in which an article is sorted by a sorter device provided in a traveling carriage traveling along a closed path, the sorting facility comprising:
   a driving device provided in the traveling carriage, the driving device driving the sorter device; and
   a control device controlling the driving device wirelessly, wherein
   the driving device includes a control unit controlling the sorter device based on an instruction from the control device,
   the control unit
      sends information about a control status of the sorter device to the control device as a response, according to a response instruction provided from the control device, and
      retains, in a case where an abnormality occurs in controlling of the sorter device, the abnormality as an abnormality record, and
   the control device
      determines, based on whether information about the control status has been sent from the control unit as a response and based on content of the information about the control status, a control status of the sorter device by the control unit,
      performs, when it is determined that the control status of the sorter device by the control unit is abnormal, control for prohibiting loading an article onto a traveling carriage including the control unit determined to have the abnormality and provides an instruction to reset the control unit,
      performs, when it is determined again that the control status of the sorter device by the control unit is abnormal after the traveling carriage including the control unit subjected to the reset instruction makes a round of the path, control for prohibiting loading an article onto the traveling carriage including the control unit and acquires the abnormality record retained in the control unit, and
      acquires, when it is determined that the control status of the sorter device by the control unit is normal after the traveling carriage including the control unit subjected to the reset instruction makes a round of the path, the abnormality record retained in the control unit.

2. The sorting facility according to claim 1, wherein
the driving device includes a driving motor driving the sorter device,
the control unit includes a driving control inverter controlling the driving motor,
the driving control inverter
  sends information about a control status of the driving motor to the control device as a response, according to a response instruction provided from the control device, and
  retains, in a case where an abnormality occurs in controlling of the driving motor, the abnormality as an abnormality record, and
the control device
  determines, based on whether information about the control status has been sent from the driving control inverter as a response and based on content of the information about the control status, a control status of the driving motor by the driving control inverter,
  performs, when it is determined that the control status of the driving motor by the driving control inverter is abnormal, control for prohibiting loading an article onto a traveling carriage including the driving control inverter determined to have the abnormality and provides an instruction to reset the driving control inverter,
  performs, when it is determined again that the control status of the driving motor by the driving control inverter is abnormal after the traveling carriage including the driving control inverter subjected to the reset instruction makes a round of the path, control for prohibiting loading an article onto the traveling carriage including the driving control inverter and acquires the abnormality record retained in the driving control inverter, and
  acquires, when it is determined that the control status of the driving motor by the driving control inverter is normal after the traveling carriage including the driving control inverter subjected to the reset instruction makes a round of the path, the abnormality record retained in the driving control inverter.

3. The sorting facility according to claim 2, wherein
the driving device includes a power generating motor generating electric power for driving the sorter device,
the control unit includes a power generation control inverter controlling the power generating motor,
the power generation control inverter
  sends information about a control status of the power generating motor to the control device as a response, according to a response instruction provided from the control device, and
  retains, in a case where an abnormality occurs in controlling of the power generating motor, the abnormality as an abnormality record, and
the control device
  determines, based on whether information about the control status has been sent from the power generation control inverter as a response and based on content of the information about the control status, a control status of the power generating motor by the power generation control inverter,
  performs, when it is determined that the control status of the power generating motor by the power generation control inverter is abnormal, control for prohibiting loading an article onto a traveling carriage including the power generation control inverter determined to have the abnormality and provides an instruction to reset the power generation control inverter,
  performs, when it is determined again that the control status of the power generating motor by the power generation control inverter is abnormal after the traveling carriage including the power generation control inverter subjected to the reset instruction makes a round of the path, control for prohibiting loading an article onto the traveling carriage including the power generation control inverter and acquires the abnormality record retained in the power generation control inverter, and
  acquires, when it is determined that the control status of the power generating motor by the power generation control inverter is normal after the traveling carriage including the power generation control inverter subjected to the reset instruction makes a round of the path, the abnormality record retained in the power generation control inverter.

4. The sorting facility according to claim 3, wherein
the sorter device includes a conveyor belt,
the sorter device includes a sensor detecting rotation of a belt of the conveyor belt, and
the control device controls the driving control inverter as to whether to permit or prohibit loading an article onto the traveling carriage, based on whether there is a detection signal from the sensor.

5. The sorting facility according to claim 2, wherein
the sorter device includes a conveyor belt,
the sorter device includes a sensor detecting rotation of a belt of the conveyor belt, and
the control device controls the driving control inverter as to whether to permit or prohibit loading an article onto the traveling carriage, based on whether there is a detection signal from the sensor.

6. The sorting facility according to claim 1, wherein
the driving device includes a power generating motor generating electric power for driving the sorter device,
the control unit includes a power generation control inverter controlling the power generating motor,
the power generation control inverter
  sends information about a control status of the power generating motor to the control device as a response, according to a response instruction provided from the control device, and
  retains, in a case where an abnormality occurs in controlling of the power generating motor, the abnormality as an abnormality record, and
the control device
  determines, based on whether information about the control status has been sent from the power generation control inverter as a response and based on content of the information about the control status, a control status of the power generating motor by the power generation control inverter,
  performs, when it is determined that the control status of the power generating motor by the power generation control inverter is abnormal, control for prohibiting loading an article onto a traveling carriage including the power generation control inverter determined to have the abnormality and provides an instruction to reset the power generation control inverter, performs, when it is determined again that the control status of the power generating motor by the power generation control inverter is abnormal after the traveling carriage including the power generation control inverter subjected to the reset instruction makes a round of the path, control for prohibiting loading an article onto the traveling carriage including the power generation control inverter and acquires the abnormality record retained in the power generation control inverter, and acquires, when it is determined that the control status of the power generating motor by the power generation control inverter is normal after the traveling carriage including the power generation control inverter subjected to the reset instruction makes a round of the path, the abnormality record retained in the power generation control inverter.

7. The sorting facility according to claim 6, wherein
the sorter device includes a conveyor belt,
the sorter device includes a sensor detecting rotation of a belt of the conveyor belt, and
the control device controls the driving control inverter as to whether to permit or prohibit loading an article onto the traveling carriage, based on whether there is a detection signal from the sensor.

8. The sorting facility according to claim 1, wherein
the sorter device includes a conveyor belt,
the sorter device includes a sensor detecting rotation of a belt of the conveyor belt, and
the control device controls the driving control inverter as to whether to permit or prohibit loading an article onto the traveling carriage, based on whether there is a detection signal from the sensor.

9. A status checking method for a traveling carriage, the traveling carriage traveling along a closed path and sorting an article using a sorter device in a sorting facility for sorting articles,
the traveling carriage including a driving device driving the sorter device,
the sorting facility including a control device controlling the driving device wirelessly,
the driving device including a control unit controlling the sorter device based on an instruction from the control device,
the status checking method comprising:
an information response instructing step of wirelessly instructing, by the control device, a control unit of a traveling carriage traveling on the path to send information about a control status of the sorter device as a response;
an information responding step of wirelessly sending, by the control unit, information about the control status of the sorter device to the control device as a response, according to an instruction from the control device in the information response instructing step;
a control status determining step of determining, by the control device, a control status of the sorter device by the control unit based on whether information about the control status has been sent from the control unit as a response in the information responding step and based on content of the information about the control status;
an abnormality record retaining step of retaining, by the control unit, when the control device determines in the control status determining step that the control status of the sorter device by the control unit is abnormal, the abnormality as an abnormality record;

a loading prohibition controlling step of performing, by the control device, when the control device determines in the control status determining step that the control status of the sorter device by the control unit is abnormal, control for prohibiting loading an article onto a traveling carriage including the control unit determined to have the abnormality;
a reset instructing step of providing, by the control device, an instruction to reset the control unit on which the control for prohibiting loading an article is performed in the loading prohibition controlling step;
a record acquiring step of acquiring, when the control device determines that the control status of the sorter device by the control unit is normal after the traveling carriage including the control unit subjected to the reset instruction in the reset instructing step makes a round of the path, the abnormality record retained in the control unit;
an abnormality record acquiring step of performing, when the control device determines again that the control status of the sorter device by the control unit is abnormal after the traveling carriage including the control unit reset in the reset instructing step makes a round of the path, control for prohibiting loading an article onto the traveling carriage including the control unit, and acquiring the abnormality record retained in the control unit; and
an abnormality determining step of determining, by the control device, an abnormality of the sorter device based on the abnormality record acquired in the record acquiring step and the abnormality record acquiring step.

10. The status checking method for a traveling carriage according to claim 9, wherein
the driving device includes a driving motor driving the sorter device,
the control unit includes a driving control inverter controlling the driving motor, and
the status checking method comprises:
a first information response instructing step of wirelessly instructing, by the control device, a driving control inverter of a traveling carriage traveling on the path to send information about a control status of the driving motor as a response;
a first information responding step of wirelessly sending, by the driving control inverter, information about the control status of the driving motor to the control device as a response, according to an instruction from the control device in the first information response instructing step;
a first control status determining step of determining, by the control device, a control status of the driving motor by the driving control inverter, based on whether information about the control status has been sent from the driving control inverter as a response in the first information responding step and based on content of the information about the control status;
a first abnormality record retaining step of retaining, by the driving control inverter, when the control device determines in the first control status determining step that the control status of the driving motor by the driving control inverter is abnormal, the abnormality as an abnormality record;
a first loading prohibition controlling step of performing, by the control device, when the control device determines in the first control status determining step that the control status of the driving motor by the driving control inverter is abnormal, control for prohibiting loading an article onto a traveling carriage including the driving control inverter determined to have the abnormality;

a first reset instructing step of providing, by the control device, an instruction to reset the driving control inverter on which the control for prohibiting loading an article is performed in the first loading prohibition controlling step;

a first record acquiring step of acquiring, when the control device determines that the control status of the driving motor by the driving control inverter is normal after the traveling carriage including the driving control inverter subjected to the reset instruction in the first reset instructing step makes a round of the path, the abnormality record retained in the driving control inverter;

a first abnormality record acquiring step of performing, when the control device determines again that the control status of the driving motor by the driving control inverter is abnormal after the traveling carriage including the driving control inverter reset in the first reset instructing step makes a round of the path, control for prohibiting loading an article onto the traveling carriage including the driving control inverter, and acquiring the abnormality record retained in the driving control inverter; and a first abnormality determining step of determining, by the control device, an abnormality of the sorter device based on the abnormality record acquired in the first record acquiring step and the first abnormality record acquiring step.

11. The status checking method for a traveling carriage according to claim 10, wherein the driving device includes a power generating motor generating electric power for driving the sorter device, the control unit includes a power generation control inverter controlling the power generating motor, and the status checking method comprises:

a second information response instructing step of wirelessly instructing, by the control device, a power generation control inverter of a traveling carriage traveling on the path to send information about a control status of the power generating motor as a response;

a second information responding step of wirelessly sending, by the power generation control inverter, information about the control status of the power generating motor to the control device as a response, according to an instruction from the control device in the second information response instructing step;

a second control status determining step of determining, by the control device, a control status of the power generating motor by the power generation control inverter, based on whether information about the control status has been sent from the power generation control inverter as a response in the second information responding step and based on content of the information about the control status;

a second abnormality record retaining step of retaining, by the power generation control inverter, when the control device determines in the second control status determining step that the control status of the power generating motor by the power generation control inverter is abnormal, the abnormality as an abnormality record;

a second loading prohibition controlling step of performing, by the control device, when the control device determines in the second control status determining step that the control status of the power generating motor by the power generation control inverter is abnormal, control for prohibiting loading an article onto a traveling carriage including the power generation control inverter determined to have the abnormality;

a second reset instructing step of providing, by the control device, an instruction to reset the power generation control inverter on which the control for prohibiting loading an article is performed in the second loading prohibition controlling step;

a second record acquiring step of performing, when the control device determines that the control status of the power generating motor by the power generation control inverter is normal after the traveling carriage including the power generation control inverter instructed to cancel stopping the control of the power generating motor subjected to the reset instruction in the second reset instructing step makes a round of the path, control for permitting loading an article onto the traveling carriage including the power generation control inverter, and acquiring the abnormality record retained in the power generation control inverter;

a second abnormality record acquiring step of performing, when the control device determines again that the control status of the power generating motor by the power generation control inverter is abnormal after the traveling carriage including the power generation control inverter reset in the second reset instructing step makes a round of the path, control for prohibiting loading an article onto the traveling carriage including the power generation control inverter, and acquiring the abnormality record retained in the power generation control inverter; and a second abnormality determining step of determining, by the control device, an abnormality of the sorter device based on the abnormality record acquired in the second record acquiring step and the second abnormality record acquiring step.

12. The status checking method for a traveling carriage according to claim 9, wherein the driving device includes a power generating motor generating electric power for driving the sorter device, the control unit includes a power generation control inverter controlling the power generating motor, and the status checking method comprises:

a second information response instructing step of wirelessly instructing, by the control device, a power generation control inverter of a traveling carriage traveling on the path to send information about a control status of the power generating motor as a response;

a second information responding step of wirelessly sending, by the power generation control inverter, information about the control status of the power generating motor to the control device as a response, according to an instruction from the control device in the second information response instructing step;

a second control status determining step of determining, by the control device, a control status of the power generating motor by the power generation control inverter, based on whether information about the control status has been sent from the power generation control inverter as a response in the second information responding step and based on content of the information about the control status;

a second abnormality record retaining step of retaining, by the power generation control inverter, when the control device determines in the second control status determining step that the control status of the power generating motor by the power generation control inverter is abnormal, the abnormality as an abnormality record;
a second loading prohibition controlling step of performing, by the control device, when the control device determines in the second control status determining step that the control status of the power generating motor by the power generation control inverter is abnormal, control for prohibiting loading an article onto a traveling carriage including the power generation control inverter determined to have the abnormality;
a second reset instructing step of providing, by the control device, an instruction to reset the power generation control inverter on which the control for prohibiting loading an article is performed in the second loading prohibition controlling step;
a second record acquiring step of performing, when the control device determines that the control status of the power generating motor by the power generation control inverter is normal after the traveling carriage including the power generation control inverter instructed to cancel stopping the control of the power generating motor subjected to the reset instruction in the second reset instructing step makes a round of the path, control for permitting loading an article onto the traveling carriage including the power generation control inverter, and acquiring the abnormality record retained in the power generation control inverter;
a second abnormality record acquiring step of performing, when the control device determines again that the control status of the power generating motor by the power generation control inverter is abnormal after the traveling carriage including the power generation control inverter reset in the second reset instructing step makes a round of the path, control for prohibiting loading an article onto the traveling carriage including the power generation control inverter, and acquiring the abnormality record retained in the power generation control inverter; and
a second abnormality determining step of determining, by the control device, an abnormality of the sorter device based on the abnormality record acquired in the second record acquiring step and the second abnormality record acquiring step.

\* \* \* \* \*